United States Patent [19]
Marrs et al.

[11] Patent Number: 6,161,760
[45] Date of Patent: Dec. 19, 2000

[54] MULTIPLE APPLICATION MULTITERMINAL DATA COLLECTION NETWORK

[75] Inventors: David Marrs, Syracuse; Louis Bruno, Auburn; Joseph Guszcza, Jordan; Timothy Meier; Matthew Pankow, both of Marcellus; James A. Parker, Liverpool; John Pettinelli, Rome; Bradley Randolph, Syracuse, all of N.Y.; Andrew Reynolds, Bothell, Wash.; Thomas Ruhlman, Skaneateles, N.Y.

[73] Assignee: Welch Allyn Data Collection, Inc., Skaneateles Falls, N.Y.

[21] Appl. No.: 09/152,583

[22] Filed: Sep. 14, 1998

[51] Int. Cl.<sup>7</sup> ............ G06F 17/00; G06F 19/00; G06K 7/10
[52] U.S. Cl. ............... 235/462.15; 235/462.25; 235/472.01
[58] Field of Search ........... 235/462.13, 462.15, 235/462.25, 472.01

[56] References Cited

U.S. PATENT DOCUMENTS

| | | |
|---|---|---|
| 4,418,277 | 11/1983 | Tremmel et al. . |
| 4,910,794 | 3/1990 | Mahany . |
| 5,029,183 | 7/1991 | Tymes . |
| 5,031,098 | 7/1991 | Miller et al. . |
| 5,195,183 | 3/1993 | Miller et al. . |
| 5,295,154 | 3/1994 | Meier et al. . |
| 5,330,371 | 7/1994 | Reddersen et al. ............ 439/502 |
| 5,349,678 | 9/1994 | Morris et al. . |
| 5,425,051 | 6/1995 | Mahany . |
| 5,541,398 | 7/1996 | Hanson . |
| 5,664,229 | 9/1997 | Bhargava et al. ............ 235/462.43 |
| 5,675,139 | 10/1997 | Fama ............................ 235/472.01 |
| 5,905,249 | 5/1999 | Reddersen et al. ........... 235/462.15 |

*Primary Examiner*—Karl D. Frech
*Attorney, Agent, or Firm*—Wall Marjama & Bilinski

[57] ABSTRACT

The invention is a multiterminal data collection network including a plurality of terminals and a base station configured so that each data collection terminal can be programmed in accordance with one of a predetermined number of available application. When a data collection terminal such as a bar code reader is programmed to operate in accordance with a particular application, the reader operates according to a data collection protocol that is the same as the data collection protocol of each other reader in the network programmed to operate in accordance with that same application. In another aspect of the invention, a base station normally transmits messages received from different readers according to different transmission protocols if the readers are programmed to operate in accordance with different applications, and transmits messages received from different readers according to the same protocol if the readers are programmed in accordance with the same application. A reader of the network can be associated with a new application group by reading of a specially designed application selector symbol.

66 Claims, 6 Drawing Sheets

GROUP 0

GROUP 1

GROUP 2

GROUP 3
}~54

GROUP 4

GROUP 5

GROUP 6

GROUP 7

GROUP 8

MULTIPLE APPLICATION MULTITERMINAL DATA COLLECTION NETWORK

BACKGROUND OF THE INVENTION

1. Field of the Invention

The invention relates to multiterminal networks in general and particularly to a multiterminal data collection network configured to support multiple applications.

2. Background of the Prior Art

Multiterminal data collection networks, especially wireless local area networks (LANs) including a plurality of bar code readers are being implemented in an ever-expanding variety of work environments. Such networks are in use for example, in retail stores, shipping stations, warehouses, assembly lines, and laboratories.

In recent years data collection terminals, including bar code readers have grown markedly in sophistication. Individual data collection terminals can now be reprogrammed by a user at a work location so that they satisfy a user's particular data collection and data transmission requirements. Data collection terminals can be reprogrammed to capture data according to the specific data collection requirements of a user, and transmit data to a host computer according to the specific data transmission requirements of a user.

The flexibility of individual data collection terminals has not, however, been extended to data collection terminals included in a data collection network. In general, data collection terminals included in currently available data collection networks collect data according to same data collection protocol as each other terminal in the network, and base stations of such networks transmit data according to a single data transmission protocol independent of which terminal initiates the data transmission.

There is a need for multiterminal data collection networks which can be readily configured to the specific requirements of a user.

SUMMARY OF THE INVENTION

According to its major aspects and broadly stated the present invention is a multiterminal data collection network including a plurality of terminals and a base station configured so that each data collection terminal can be programmed in accordance with one of a predetermined number of available applications.

When a data collection terminal such as a bar code reader is programmed to operate in accordance with a particular application, the reader operates according to a data collection protocol that is the same as the data collection protocol of each other reader in the network programmed to operate in accordance with that application. In another aspect of the invention, a base station normally transmits messages received from different readers according to different transmission protocols if the readers are programmed to operate in accordance with different applications, and transmits messages received from different readers according to the same protocol if the readers are programmed in accordance with the same application.

A major advantage of the invention is that a first group of readers in a network can collect, and data from those readers can be sent, according to protocols that best satisfy the requirements of a first application, while a second group of readers of the same network can collect, and data from those readers can be sent according to protocols that best satisfy the requirements of a second application. A first application may be merchandise symbol reading, for example, while a second application may be security badge symbol reading.

The invention may be facilitated by providing a reader-application table in a system memory which correlates each reader of the network with a current application. Also included preferably in a base station memory is an application-parameter table correlating the various possible applications of the network with data collection parameters defining the various applications. When a base station calls a parameter included in the application-parameter table, it may read the parameter directly from the parameter table in the row corresponding to the application with which the reader identifier of the message being processed is presently correlated. When a reader calls a parameter included in the application-parameter table, the reader may read the parameter from a subset of the application-parameter table which has been previously uploaded to the reader by the base station.

A reader may be associated with a new application by reading of a specially designed symbol known as an application selector symbol. An application selector symbol may be included on a menu sheet containing a plurality of application selector symbols, one symbol corresponding to each possible application of the network.

These and other details, advantages and benefits of the present invention will become apparent from the detailed description of the preferred embodiment hereinbelow.

DETAILED DESCRIPTION OF THE INVENTION

Figure 1:
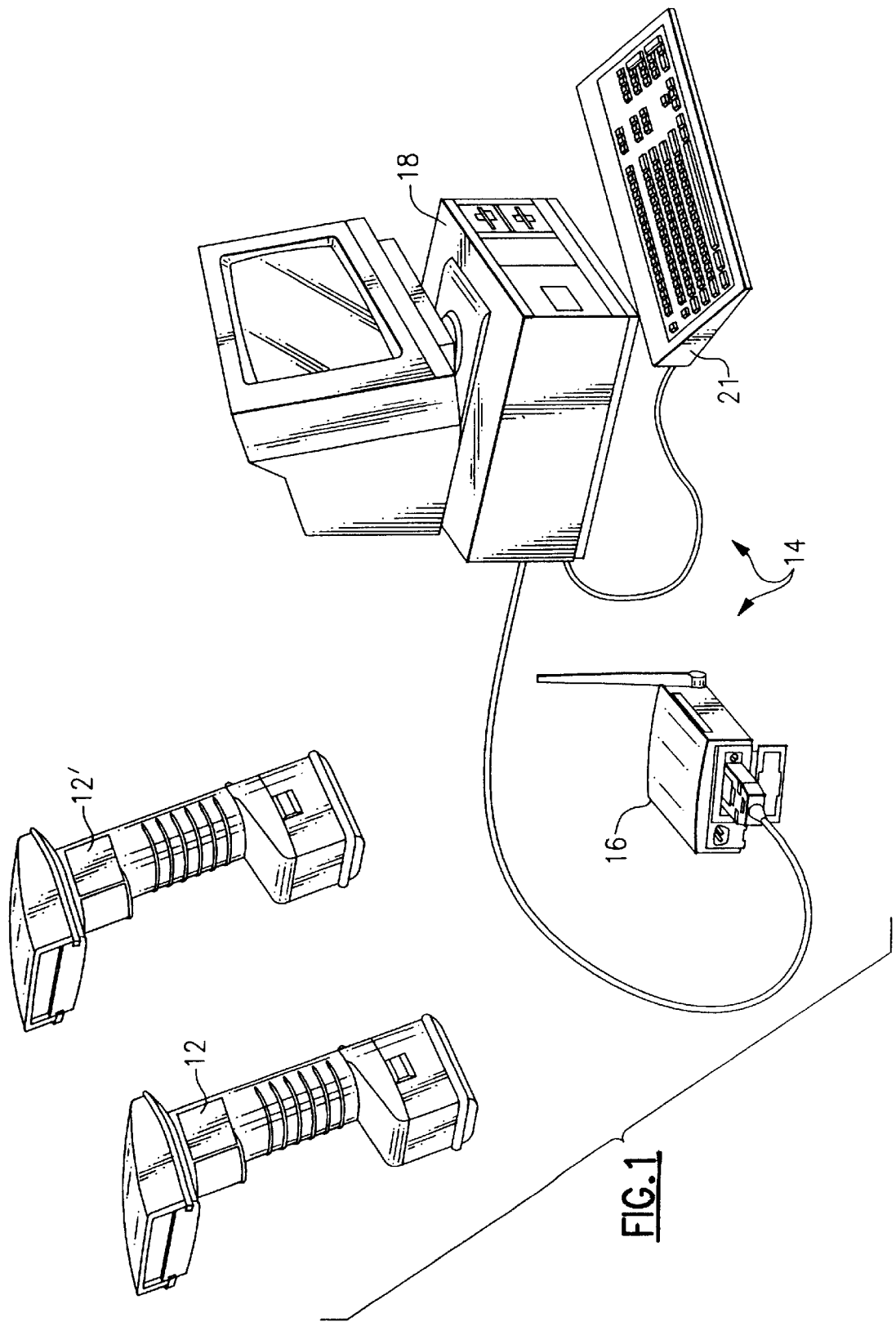
FIG. 1 is a system diagram of a multiterminal data collection network of the type in which the present invention may be incorporated.
Figure 2:
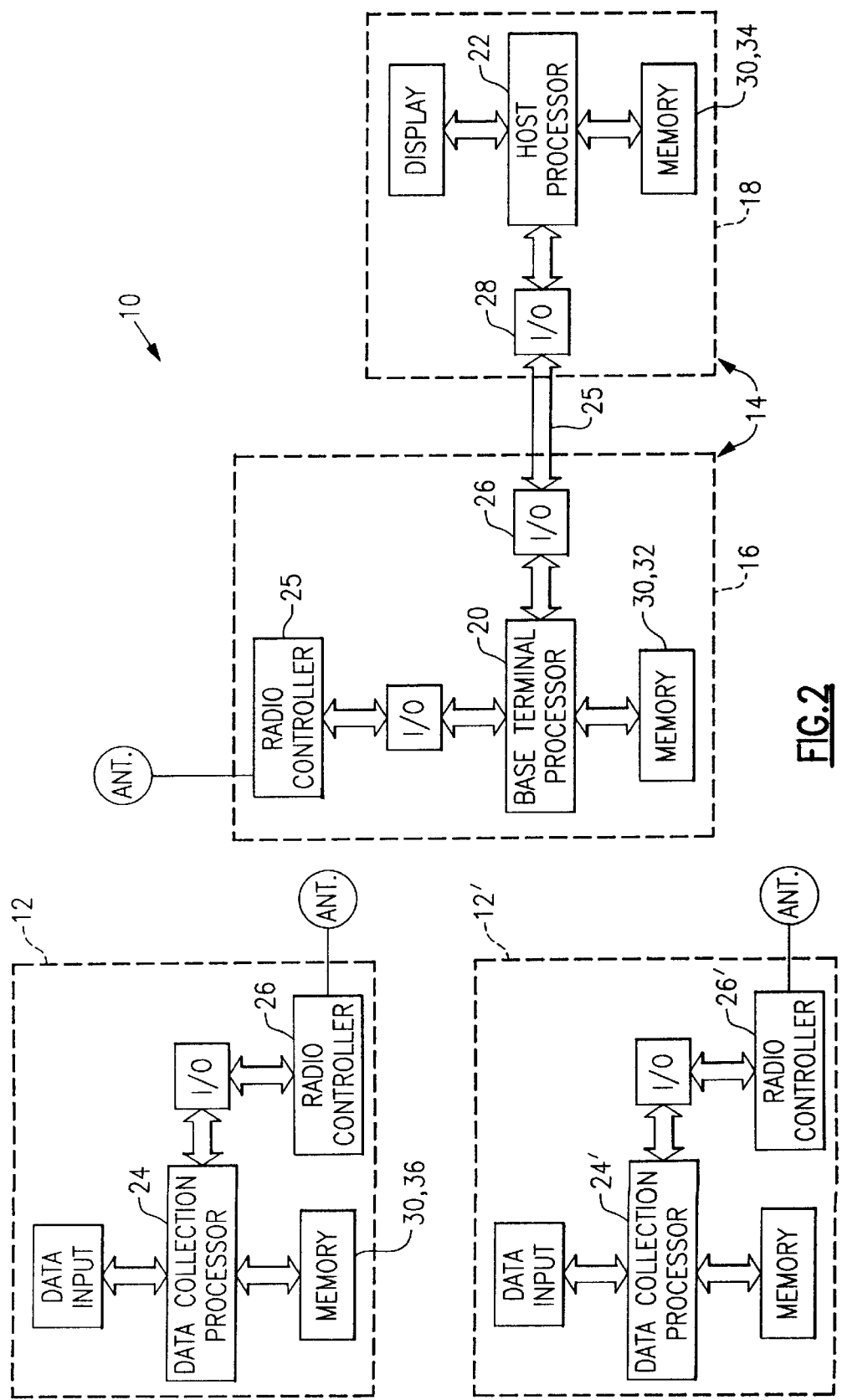
FIG. 2 is a block electrical diagram of a multiterminal data collection network of the type in which the present invention may be incorporated.

A multiterminal data collection network of the type which the present invention may be incorporated is described with reference to system diagram of FIG. 1, and the system block diagram of FIG. 2. Network 10 includes one or more data collection terminal 12, 12' and a base station 14. In the network shown, terminals 12, 12' are provided by bar code readers which in general may be image sensor based or laser scan engine based. Terminals 12, 12' could also be provided by other forms of data collection devices such as check readers, mag stripe readers, RF ID readers or smart card readers, etc. Base station 14 typically includes a base terminal 16 which is in communication with a host computer 18. Base terminal 16 of base station 14 typically includes a processor 20 programmed to coordinate the reception of the data from each of the various terminals of the network and to coordinate transmission of data received from the readers to host computer 18. Host computer 18 typically includes a processor 22 programmed to further process data collected by the terminals of the network. Host computer 18 may include at least one high level data processing software program such as a graphical display software program, a spreadsheet program, or word processing program for arranging, displaying, and organizing data received from the network terminals.

Referring to further aspects of network 10, readers 12, 12' may be hard-wired to base station 14 but are preferably in wireless communication with the base station as shown. Preferably, base station 14 and each of the readers 12, 12' include radio controllers 25, 26, 26' adapted to provide frequency hopping spread spectrum communication (FHSS), between base station and readers. As known in the art, FHSS is a form of spread spectrum radio transmission that produces a narrow band signal that hops among a plurality of frequencies in a prearranged pattern. FHSS is commonly used in commercial environments due to its ability to minimize errors due to an interference on an individual frequency or jamming. Skilled artisans will recognize that base station may communicate with terminals via other wireless communications techniques.

Base terminal 16 is normally hard wired to host computer 18 via a cable 25 connected between RS 232 I/O ports 26 and 28 of base terminal and host 18. Base terminal 16 could also be provided by a "wedge" style terminal interposed between a keyboard 21 and a keyboard I/O port associated with processor 22.

In other possible embodiments, communication links between base terminal 16 and host 18 and between base terminal 16 and terminals 12 could be provided by an ethernet link or a universal serial bus, for example.

Network 10 further includes system memory 30 comprised of the individual memory structures 32, 34, 36 included in and in communication with the various processors 20, 22, 24 of network 10. These memory structures shall be referred to herein as base terminal memory 32, host processor memory 34, and data collection terminal memory 36, 36'.

A network according to the invention is adapted to facilitate contemporaneous execution of a plurality of applications. In each application which may be executed by network 10, an individual data collection terminal of the network collects data according to a data collection protocol that is specific to that application and/or base station transmits data received from an individual data terminal according to a data transmission protocol that is specific to that application. By contemporaneous execution of first and second applications, it is meant that the first and second terminals of the network may be adapted to collect data according to different data collection protocols at the same time (the two terminals if they are bar code readers, may decode different symbologies, read at different rates, etc.). It is also meant by contemporaneous execution that a next data message transmitted by base station 14 may be sent in accordance with a transmission protocol that is distinct from that of a previously sent message if the next and previous messages originated from different terminals operating in accordance with different applications.

According to the invention, a first and second terminal 12, 12' may be adapted to collect data according to protocols, and base station 14 may transmit data from each of the readers according to protocols that best fit the need of a user. For example, if network 10 is configured to facilitate execution of a security badge symbol reading application and a merchandise symbol reading application, then first reader 12 may be specially adapted to read security badges, while second reader 12' may be specially adapted to read bar code systems on merchandise. If the security badge reading and merchandise symbol reading applications have different data transmission requirements, then the base station 14 can be configured to transmit messages received from the two terminals according to different data transmission protocols.

For a network including N terminals, then each possible application of network (there being an infinite number of applications that may be programmed) may have 0 to N terminals operating according to that application. When more than one terminal operates according to one specific application, that collection of terminals operating in accordance with that application can be referred to as an application group.

Figure 3:
FIG. 3 is an example of a terminal-application table of the invention.
Figure 4:
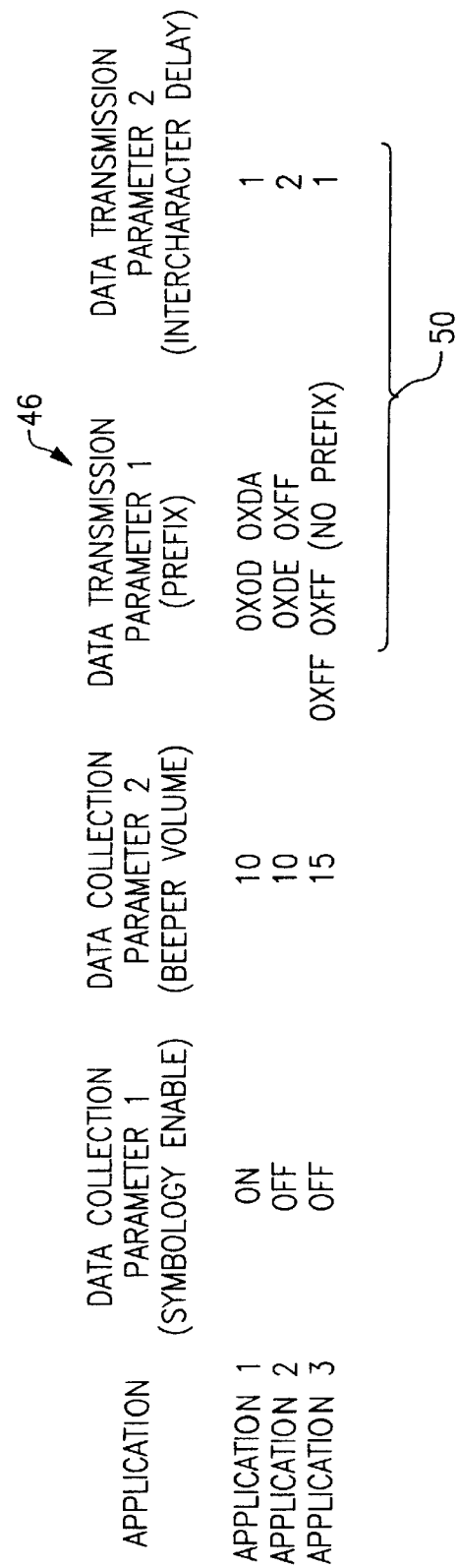
FIG. 4 is an example of an application-parameter table of the invention.

Referring now to FIGS. 3 and 4, exemplary software structures facilitating the present invention will be described in detail. For facilitating the invention, the memory system 30 of network 10 preferably includes a lookup table 40 correlating, with use of suitable identifiers, each reader of the network with the current application associated with each reader. Lookup table 40 can, in theory, be stored in any memory structure of network 10, but is preferably included in base terminal memory 32 so that the number of data transmissions required for configuring network 10 to support multiple applications is reduced.

In addition to having reader-application lookup table 40 memory system 30 also preferably includes an application-parameter table correlating each application with at least one parameter that controls an aspect either of a data collection protocol or a data transmission protocol. Preferably, a main application-parameter table 46 is stored in base terminal memory 32 that correlates a present application, expressed with an identifier, with a plurality of reader parameters 48 which control various aspects of a data collection protocol pertaining to that application, and a plurality of data transmission parameters 50 associated with that application. From time to time during the operation of a network reader 12, reader 12 will call on a parameter which affects an operation of a reader, such as for example whether or not to decode a certain symbology, or volume control, or another aspect of reader operation. As seen by FIGS. 3 and 4, the value of this parameter if included in table 46 will be determined by the application that is currently correlated in table 40 with that reader. Likewise, base terminal 16, before sending data packets to host computer 18, will call on certain parameters to determine certain aspects of the data transmission, for example, the format of a prefix to the transmission, or a suffix. The particular parameter values which are called, as seen by FIGS. 3 and 4, are also dependent on the application currently correlated in table 40 with the reader from which the present message originated.

When base terminal 16 calls a parameter included in table 46 it may read the parameter directly from table 46 after determining the application currently correlated in table 40 with the reader identifier cf the present message. However, since it would be impractical for a reader 12 to read a parameter directly from table 46 each time a reader calls a parameter included in table 46, a subset of table 46 is periodically uploaded to reader 12.

A subset of table 46 containing data collection parameters corresponding to the current application of reader 12 is preferably uploaded to reader 12 when the current application associated with the reader is first established and thereafter whenever the current application of the reader is changed. A default application for a reader 12 can be established when the reader is first associated with network 10.

A current application for a reader can be changed in a variety of different ways. For example, a program can be established in host computer 18 which, when executed, causes a change in table 40. Preferably, however, a current application for a network reader 12 is changed with use of menuing symbols as is explained with reference to FIG. 5.

Figure 5:
FIG. 5 shows an application selector symbol menu sheet according to the invention.
Figure 5:
Figure 5:
Figure 5:
Figure 5:
Figure 5:
Figure 5:
Figure 5:

A menu selection sheet for changing a current application of a reader is shown in FIG. 5. The selection sheet shown contains nine application selection symbols. One symbol is included for each possible application for the network. When a reader reads and decodes an application selector symbol 54, then a series of bits of the decoded message indicate that the decoded message is an application selector symbol and further bits of the decoded message symbol indicate the identity of the application selector symbol. Further, each data packet sent by reader 12 to base station 14 includes a series of bits indicating the particular reader in the network from which the message originated. Thus, when base station 14 reads a message corresponding to a decoded application selector symbol, the base station can recognize which reader has requested a change of its current application and which particular application has been selected by that reader.

Figure 6:
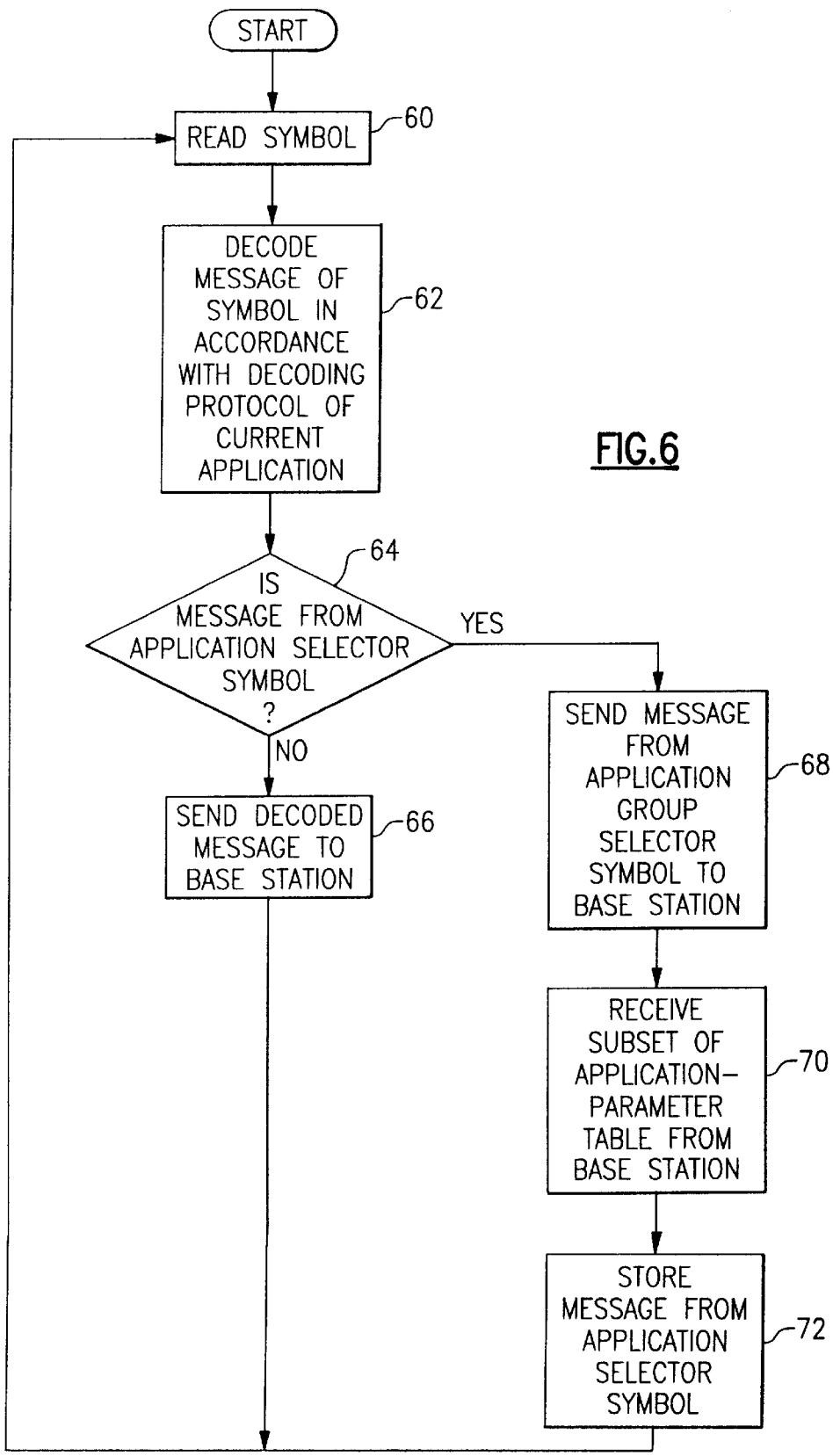
FIG. 6 shows an exemplary reader flow diagram according to the invention.
Figure 7:
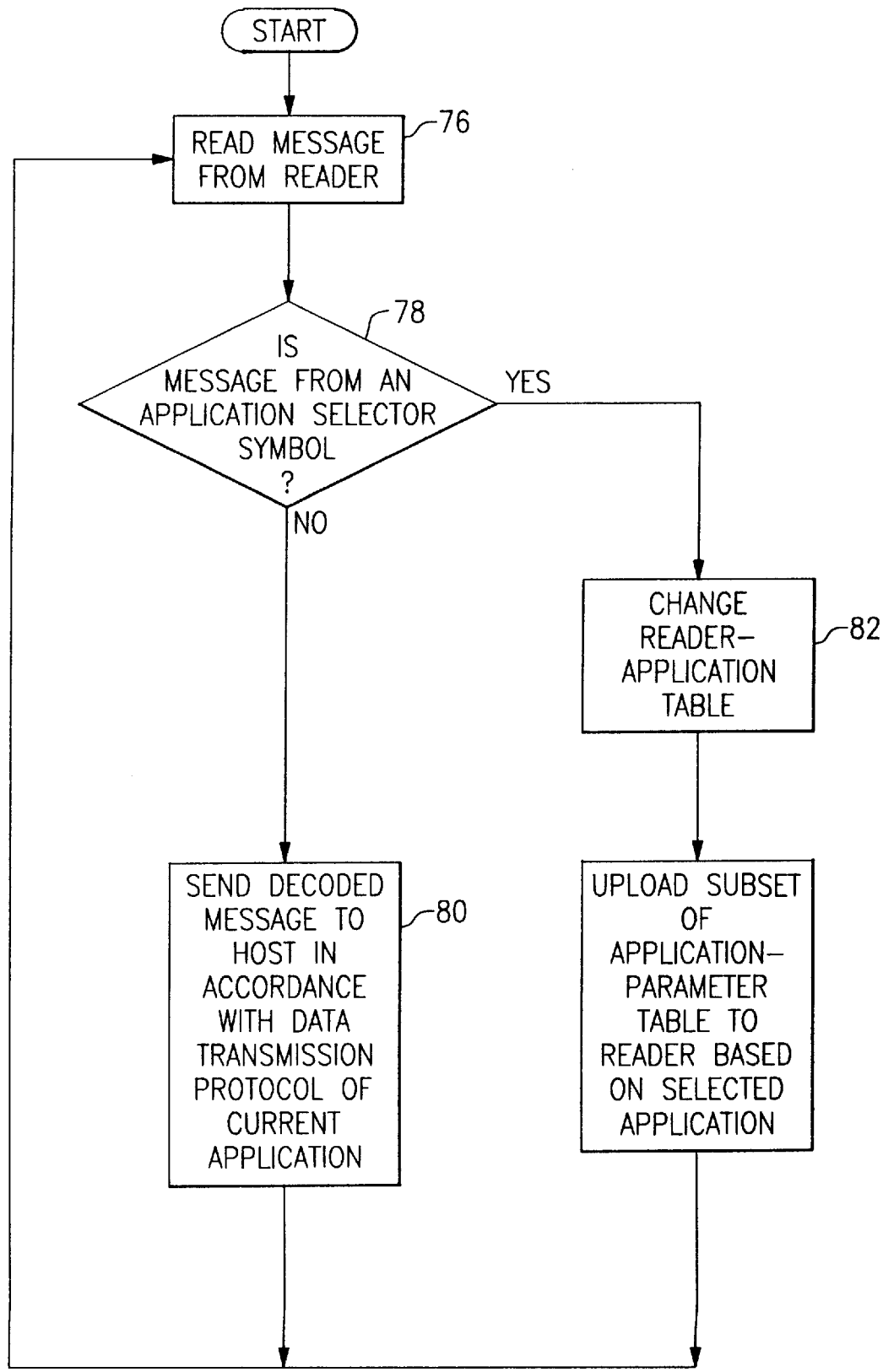
FIG. 7 shows an exemplary base station flow diagram according to the invention.

Major operational aspects of a reader and of a base station according to the invention are described with reference to the flow diagrams of FIGS. 6 and 7. A reader flow diagram is shown in FIG. 6. After reading and decoding a symbol (blocks 60, 62), a reader at block 64 determines if the decoded message pertains to an application selector symbol 54. If the symbol is not an application selector symbol, then reader 12 sends the decoded message to base station 14 at block 66 and proceeds to block 60 to read another symbol. If the reader determines at block 64 that the decoded message does pertain to an application selector symbol, then reader sends the message including a new application identifier to base station 14 at block 68, and at block 70 receives a subset of application parameter table 46 corresponding to the data collection parameters associated with the new application.

Preferably, reader 12 is configured so that when the reader is first powered up, reader 12 sends a message to base station 14 that indicates the last application of reader before the reader was powered down. To the end that such a message can be sent, reader 12 stores in memory 36 at least a partial contents of decoded message from an application selector symbol as indicated by block 72 each time an application selector symbol is read.

Operational aspects of a base station of the invention are described with reference to the flow diagram of FIG. 7. At block 76, base station 14 normally at terminal 16 reads a message from a reader 12 and at block 78 determines if the message pertains to an application selector symbol. If the message does not pertain to an application selector symbol, then terminal 16 at block 80 transmits the message to host 18 in accordance with the current application's data transmission protocol. When during execution of block 80, base terminal 16 requires a parameter value of a parameter included in application parameter table 46, base terminal reads the parameter from table 46 in accordance with the application from table 40 that is correlated with the reader identifier of the message currently being transmitted.

If at block 78 base terminal determines that the message is from an application selector symbol, then terminal 16 at block 82 changes table 40 so that the application correlated with the reader identifier of the message being read corresponds to the application identifier of the message being read. At block 84 the base terminal then uploads to the reader making the application change request a subset of application parameter table 46 including data collection parameters in rows corresponding to the just-selected application.

An important feature of the invention is that the network can be configured so that parameters called by base station 14 control transfers of data within the host computer 18. Host computer 18 may be configured so that the particular word forming a prefix or suffix, for example, determines which high level data processing program processes messages received by host 18. A host 18 receiving a first message having a first prefix may transfer the data to a word processing program file and may transfer second message having a second prefix to a spreadsheet program file, for example. Because parameters can be made to vary from application to application in the present invention, it can be seen that a feature of the invention is that messages originating from a first terminal 12 programmed in accordance with a first application can be processed by a high level data processing program in host 18 that is different from a high level data processing program in host 18 processing messages originating from a second terminal programmed to operate in accordance with a second application.

While the application-parameter table 46 is shown in FIG. 4 as having only 4 parameters, it will be understood that table 46 can be made to have several additional parameters distinguishing operational aspects of the various applications from one another.

Data collection parameters which may be incorporated in table 46 include symbology on/off parameters, which configure a reader to attempt to decode or to not attempt to decode certain symbologies, a beeper volume parameter, an aiming beam enable/disable parameter, a redundancy enable/disable parameter (which controls whether or not a reader will be required to decode the same message from a symbol a predetermined number of times before sending the message), a host acknowledge enable/disable parameter (controlling whether the network will be configured such that the base station will send a confirmation from a reader after receiving a message from the reader); and other parameters controlling particular aspects of a host acknowledge protocol if a host acknowledge feature is enabled.

In addition to the above parameters, it will be understood that parameters called by data collection aspects of data collection terminal operation that do not involve data collection per se. For example, parameters may be called by data collection terminals that affect data transmissions from terminals to base station 14. Transmission influencing data collection parameters can be established, for example, to control aspects of radio operation, to control baud rate, parity enabling/disabling, data length, stopbits, or to control data formatting (i.e. prefixes and suffixes) of messages transmitted by terminals 12 to base station 14.

Data transmission parameters which may be incorporated in table 46 include a prefix parameter (determining whether or not a word will precede a sent message, and the content of such a word if present), a suffix parameter (determining whether or not a word will be attached to a sent message, and the content of that word if such a word is present), a code ID parameter (determining whether the message will contain a word identifying the symbology of the decoded message), keyboard interface control parameters, intermessage and intercharacter delay parameters, an interfunction delay parameter (controlling a delay subsequent to a non-character function code message elements), host port baud rate, parity enable/disable, data length, and stopbit parameters, auxiliary port baud rate, parity enable/disable, data length, and stopbit parameters, host acknowledge enable/disable parameters, host acknowledge control parameters, and wandem rate and polarity parameters. Wandem is an available output polarity parameters. Wandem is an available output interface which transmits digital signals representing bar and space patterns constructed from character messages. It is seen that in order to enable a host acknowledge feature, host acknowledge enable/disable parameters and host acknowledge control parameters may be called both by terminals 12 of the network and by base station 14.

In addition to a menu selection sheet being provided as shown in FIG. 5 containing a plurality of application selector symbols, an additional menu selection symbol-containing sheet or sheets similar to the sheet of FIG. 5 may be provided for changing individual parameter values, e.g. beeper volume, intermessage delay. Symbols whose reading results in an individual parameter value being changed can be termed parameter selection symbols.

In a preferred embodiment of the invention, the decoding of a parameter selection symbol by a reader of a given application group changes operation of each reader in the network of that same application group. To this end, base terminal 16 may be programmed such that when it recognizes a message as a message decoded from a parameter selector symbol from a particular reader, it causes the parameter changed in the individual reader, if it is included in the application-parameter table to be changed to the application-parameter table 46. Further, if the parameter is a data collection parameter, then terminal 16 may cause a data collection parameter subset of table 46 corresponding to the application currently correlated with the particular reader to be uploaded to each reader in the network that is currently correlated, in reader-application table 40 with that same application.

While this invention has been explained with reference to the structure disclosed herein, it is not confined to the details set forth and this invention is intended to cover any modifications and changes as may come within the scope of the following claims:

What is claimed is:

1. A multiterminal data collection network comprising:
   a plurality of data collection terminals;
   a base station;
   a system memory;
   terminal-application correlation means stored in said system memory for correlating at least one terminal of said network with an application of said network;
   wherein at least one operational aspect either of one of said terminals or said base station depends on a terminal-application correlation of said terminal-application correlation means.

2. The network of claim 1, further comprising means for changing terminal to application correlations of said terminal-application correlation means.

3. The network of claim 1, further comprising changing means initiated by one of said terminals for changing a correlation of said terminal-application correlation means.

4. The network of claim 2, wherein at least one of said terminals is a bar code reader and wherein said changing means comprises:
   an application selector symbol;
   means for reading and decoding a message from said application selector symbol; and
   means for altering a correlation of said terminal-application correlation means in accordance with said message.

5. The network of claim 3, wherein at least one of said terminals includes an associated terminal memory, and wherein said changing means comprises:
   means for storing in said terminal memory at least a partial contents of each message decoded by at least one reader that corresponds to an application selector symbol;
   means for transmitting on power up of said at least one reader said at least partial contents of a last stored message corresponding to an application selector means; and
   means responsive to said transmitting means for updating said terminal-reader correlation means.

6. The network of claim 1, further comprising application-parameter correlation means correlating applications of said network with parameters called by at least one of either of said terminals or said base station of said network.

7. The network of claim 6, wherein at least one parameter of said application-parameter correlation means is a data collection parameter called by at least one of said data collection terminals.

8. The network of claim 6, wherein said at least one parameter of said application-parameter correlation means is a data transmission parameter called by said base station.

9. The network of claim 6, wherein said base station includes a base terminal having an associated base terminal memory, and wherein said terminal-application correlation means and said application-parameter correlation means are stored in said base terminal memory.

10. The network of claim 9, wherein said application-parameter correlation means is provided by an application-parameter table and wherein a subset of said application-parameter table is periodically uploaded to at least one of said terminals.

11. The network of claim 6, wherein said application-parameter correlation means comprises a plurality of application identifiers and a plurality of parameter identifiers, each application identifier being correlated with a plurality of said parameter identifiers.

12. The network of claim 1, wherein said terminal-application correlation means is provided by a terminal-application lookup table.

13. The network of claim 1, wherein said base station includes a base terminal having an associated base terminal memory, and wherein said terminal-application correlation means is stored in said base terminal memory.

14. The network of claim 1, wherein said terminals are provided by bar code readers, wherein said network further includes an application-parameter table correlating said applications of said network with at least one data collection parameter, and wherein said network further comprises:
   means for reprogramming at least one of said readers, said at least one reader having a certain associated application;
   means responsive to said reprogramming means for altering said application-parameter table; and
   means responsive to said altering means for uploading to all readers a subset of said altered application-parameter table to all of said readers of said network having an application in common with said certain associated application of said at least one parameter.

15. The network of claim 1, wherein said reader reprogramming means include a parameter selector symbol.

16. The network of claim 1, wherein at least one aspect of a data collection protocol of at least one of said terminals and at least one aspect of a data transmission protocol of said base station depends on a terminal-application correlation of said terminal-application correlation means.

17. A method for operating a multiterminal data collection network, said network including a plurality of terminals, a base station for receiving messages from the various terminals, and a system memory, said method comprising the steps of:

establishing a terminal-application correlation means in said system memory for correlating at least one terminal of said network with at least one application of said network;

storing an application-parameter correlation means in said system memory for correlating a plurality of applications of said network with at least one data collection parameter for each application; and programming said at least one of said terminals to call, during operation of said terminal, a data collection parameter stored in said application-parameter correlation means so that operation of said at least one terminal depends on which application said at least one terminal is correlated with in said terminal-application correlation means.

18. The method of claim 17, further comprising the step of changing an application with which said at least one terminal is correlated with in said terminal-application correlation means so that operation of said at least one terminal is changed.

19. The method of claim 17, wherein said data collection terminals are bar code readers and wherein said changing step includes the steps of:

configuring said network so that a correlation of said terminal-application correlation means changes when one of said readers decodes an application changing message;

providing an application-selector symbol that codes an application changing message; and decoding and reading with one of said readers said application-selector symbol.

20. The method of claim 17, wherein said base station includes a base terminal having an associated base terminal memory, and wherein said establishing step includes the step of establishing said terminal-application correlation means in said base terminal memory.

21. The method of claim 20, wherein said storing step includes the step of storing said application-parameter correlation means in said base terminal memory.

22. The method of claim 17, wherein said application-parameter correlation means stored in said storing means further correlates a plurality of applications of said network with at least one data transmission parameter for each application, and wherein said method further comprises the step of configuring said base station to call a data transmission parameter stored in said application-parameter correlation means so that operation of said base station depends on which application a reader that has initiated a present message is correlated with in said terminal-application correlation means.

23. The method of claim 17, wherein said network includes at least three terminals, and wherein at least two of said terminals are correlated with a first application, so that said two terminals correlated with said first application operate according to the same data collection protocol, which data collection protocol is different from the operation protocol or protocols of remaining terminals in the network.

24. The method of claim 17, wherein said terminal-application correlation means comprises a plurality of terminal identifiers and a plurality of application identifiers, each terminal identifier being correlated with one of said application identifiers.

25. The method of claim 17, wherein said application-parameter correlation means comprises a plurality of application identifiers and a plurality of parameter identifiers, each application identifier being correlated with a plurality of said parameter identifiers.

26. The method of claim 17, wherein said terminal-application correlation means comprises a plurality of terminal identifiers and a plurality of application identifiers, each terminal identifier being correlated with one of said application identifiers, wherein said application-parameter correlation means comprises a plurality of application identifiers and a plurality of parameter identifiers, each application identifier being correlated with a plurality of said parameter identifiers.

27. A method for operating a multiterminal data collection network, said network including a plurality of terminals, a base station for receiving messages from the various terminals, and a system memory, said method comprising the steps of:

establishing a terminal-application correlation means in said system memory for correlating at least one terminal of said network with at least one application of said network;

storing an application-parameter correlation means in said system memory for correlating a plurality of applications of said network with at least one data transmission parameter for each application; and configuring said base station to call, during operation of said base station, a data transmission parameter stored in said application-parameter correlation means so that operation of said base station depends on which application a reader that has initiated a present message is correlated with in said terminal-application correlation means.

28. The method of claim 27, further comprising the step of changing an application with which said at least one terminal is correlated with in said terminal-application correlation means so that operation of said base station is changed.

29. The method of claim 27, wherein said data collection terminals are bar code readers and wherein said changing step includes the steps of:

configuring said network so that a correlation of said terminal-application correlation means changes when one of said readers decodes an application charging message;

providing an application-selector symbol that codes an application changing message; and decoding and reading with one of said readers said application-selector symbol.

30. The method of claim 27, wherein said base station includes a base terminal having an associated base terminal memory, and wherein said establishing step includes the step of establishing said terminal-application correlation means in said terminal base memory.

31. The method of claim 30, wherein said storing step includes the step of storing said application-parameter correlation means in said base terminal memory.

32. The method of claim 27, wherein said network includes at least three terminals, and wherein at least two of said terminals are correlated with a first application, so that when said base station transmits messages initiated in either of said two terminals correlated with said first application, said base station operates according to the same data transmission protocol, which data transmission protocol is different from a data transmission protocol of said base station when said base station sends messages initiated by terminals of said network not correlated with said first application.

33. The method of claim 26, wherein said terminal-application correlation means comprises a plurality of terminal identifiers and a plurality of application identifiers, each terminal identifier being correlated with one of said application identifiers.

34. The method of claim 27, wherein said application-parameter correlation means comprises a plurality of application identifiers and a plurality of parameter identifiers, each application identifier being correlated with a plurality of said parameter identifiers.

35. The method of claim 27, wherein said terminal-application correlation means comprises a plurality of terminal identifiers and a plurality of application identifiers, each terminal identifier being correlated with one of said application identifiers, wherein said application-parameter correlation means comprises a plurality of application identifiers and a plurality of parameter identifiers, each application identifier being correlated with a plurality of said parameter identifiers.

36. A multi-terminal data collection network comprising:
a plurality of data collection terminals;
a base station;
a system memory;
a terminal-application correlation table stored in said system memory which correlates at least one terminal of said network with an application of said network;
wherein at least one operational aspect either of one of said terminals or said base station depends on a terminal-application correlation of said terminal-application correlation table.

37. The network of claim 36, further comprising means for changing terminal to application correlations of said terminal-application correlation table.

38. The network of claim 36, further comprising changing means initiated by one of said terminals for changing a correlation of said terminal-application correlation table.

39. The network of claim 36, further comprising an application-parameter correlation table which correlates applications of said network with parameters called by at least one of either of said terminals or said base station of said network.

40. The network of claim 39, wherein at least one parameter of said application-parameter correlation table is a data collection parameter called by at least one of said data collection terminals.

41. The network of claim 39, wherein said at least one parameter of said application-parameter correlation table is a data transmission parameter called by said base station.

42. The network of claim 39, wherein said base station includes a base terminal having an associated base terminal memory, and wherein said terminal-application correlation table and said application-parameter correlation table are stored in said base terminal memory.

43. The network of claim 42, wherein a subset of said application-parameter correlation table periodically uploaded to at least one of said terminals.

44. The network of claim 39, wherein said application-parameter correlation table comprises a plurality of application identifiers and a plurality of parameter identifiers, each application identifier being correlated with a plurality of said parameter identifiers.

45. The network of claim 36, wherein said base station includes a base terminal having an associated base terminal memory, and wherein said terminal-application correlation table is stored in said base terminal memory.

46. The network of claim 36, wherein said terminal-application correlation means comprises a plurality of terminal identifiers and a plurality of application identifiers, each terminal identifier being correlated with one of said application identifiers.

47. The network of claim 1, wherein said terminal-application correlation means comprises a plurality of terminal identifiers and a plurality of application identifiers, each terminal identifier being correlated with one of said application identifiers.

48. A method for operating a multi-terminal data collection network, said network including a plurality of terminals, a base station for receiving messages from the various terminals, and a system memory, said method comprising the steps of:
establishing a terminal-application correlation table in said system memory for correlating at least one terminal of said network with at least one application of said network;
storing an application-parameter correlation table in said system memory for correlating a plurality of applications of said network with at least one data collection parameter for each application; and
programming said at least one of said terminals to call, during operation of said terminal, a data collection parameter stored in said application-parameter correlation table so that operation of said at least one terminal depends on which application said at least one terminal is correlated within said terminal-application correlation table.

49. The method of claim 48, further comprising the step of changing an application with which said at least one terminal is correlated within said terminal-application correlation table so that operation of said at least one terminal is changed.

50. The method of claim 48, wherein said data collection terminals are bar code readers and wherein said changing step includes the steps of:
configuring said network so that a correlation of said terminal-application correlation table changes when one of said readers decodes an application changing message;
providing an application-selector symbol that codes an application changing message; and
decoding and reading with one of said readers said application-selector symbol.

51. The method of claim 48, wherein said base station includes a base terminal having an associated base terminal memory, and wherein said establishing step includes the step of establishing said terminal-application correlation table in said base terminal memory.

52. The method of claim 51, wherein said storing step includes the step of storing said application-parameter correlation table in said base terminal memory.

53. The method of claim 48, wherein said application-parameter correlation table stored in said storing means further correlates a plurality of applications of said network with at least one data transmission parameter for each application, and wherein said method further comprises the step of configuring said base station to call a data transmission parameter stored in said application-parameter correlation table so that operation of said base station depends on which application a reader that has initiated a present message is correlated with in said terminal-application correlation table.

54. The method of claim 48, wherein said network includes at least three terminals, and wherein at least two of said terminals are correlated with a first application, so that said two terminals correlated with said first application operate according to the same data collection protocol, which data collection protocol is different from the operation protocol or protocols of remaining terminals in the network.

55. The method of claim 48, wherein said terminal-application correlation table comprises a plurality of terminal identifiers and a plurality of application identifiers, each terminal identifier being correlated with one of said application identifiers.

56. The method of claim 48, wherein said application-parameter correlation table comprises a plurality of application identifiers and a plurality of parameter identifiers, each application identifier being correlated with a plurality of said parameter identifiers.

57. The method of claim 48, wherein said terminal-application correlation table comprises a plurality of terminal identifiers and a plurality of application identifiers, each terminal identifier being correlated with one of said application identifiers, wherein said application-parameter correlation table comprises a plurality of application identifiers and a plurality of parameter identifiers, each application identifier being correlated with a plurality of said parameter identifiers.

58. A method for operating a multi-terminal data collection network, said network including a plurality of terminals, a base station for receiving messages from the various terminals, and a system memory, said method comprising the steps of:

establishing a terminal-application correlation table in said system memory for correlating at least one terminal of said network with at least one application of said network;

storing an application-parameter correlation table in said system memory for correlating a plurality of applications of said network with at least one data transmission parameter for each application; and configuring said base station to call, during operation of said base station, a data transmission parameter stored in said application-parameter correlation table so that operation of said base station depends on which application a reader that has initiated a present message is correlated within said terminal-application correlation table.

59. The method of claim 58, further comprising the step of changing an application with which said at least one terminal is correlated within said terminal-application correlation table so that operation of said base station is changed.

60. The method of claim 58, wherein said data collection terminals are bar code readers and wherein said changing step includes the steps of:

configuring said network so that a correlation of said terminal-application correlation table changes when one of said readers decodes an application changing message;

providing an application-selector symbol that codes an application changing message; and decoding and reading with one of said readers said application-selector symbol.

61. The method of claim 58, wherein said base station includes a base terminal having an associated base terminal memory, and wherein said establishing step includes the step of establishing said terminal-application correlation table in said base terminal memory.

62. The method of claim 61, wherein said storing step includes the step of storing said application-parameter correlation table in said base terminal memory.

63. The method of claim 58, wherein said network includes at least three terminals, and wherein at least two of said terminals are correlated with a first application, so that when said base station transmits messages initiated in either of said two terminals correlated with said first application, said base station operates according to the same data transmission protocol, which data transmission protocol is different from a data transmission protocol of said base station when said base station sends messages initiated by terminals of said network not correlated with said first application.

64. The method of claim 58, wherein said terminal-application correlation table comprises a plurality of terminal identifiers and a plurality of application identifiers, each terminal identifier being correlated with one of said application identifiers.

65. The method of claim 58, wherein said application-parameter correlation table comprises a plurality of application identifiers and a plurality of parameter identifiers, each application identifier being correlated with a plurality of said parameter identifiers.

66. The method of claim 58, wherein said terminal-application correlation table comprises a plurality of terminal identifiers and a plurality of application identifiers, each terminal identifier being correlated with one of said application identifiers, wherein said application-parameter correlation table comprises a plurality of application identifiers and a plurality of parameter identifiers, each application identifier being correlated with a plurality of said parameter identifiers.

* * * * *